US000001110H

United States Statutory Invention Registration [19]

[11] Reg. Number: H1110

Smaardijk et al.

[43] Published: Nov. 3, 1992

[54] RESIN COMPOSITIONS

[75] Inventors: Abraham A. Smaardijk; Arris H. Kramer, both of Amsterdam, Netherlands

[73] Assignee: Shell Oil Company, Houston, Tex.

[21] Appl. No.: 458,252

[22] Filed: Dec. 28, 1989

[30] Foreign Application Priority Data

Jan. 17, 1989 [GB] United Kingdom ..... 8900953

[51] Int. Cl.[5] ..... B32B 15/08; C08F 283/00; C08G 18/00; C08G 8/30

[52] U.S. Cl. ..... 428/460; 525/452; 525/502; 525/518; 525/539; 525/498

[58] Field of Search ..... 525/518, 540, 502, 498

[56] References Cited

U.S. PATENT DOCUMENTS

| | | | |
|---|---|---|---|
| 3,694,412 | 9/1972 | Nozaki | 260/63 CQ |
| 4,070,532 | 1/1978 | Hammer | 525/451 |
| 4,115,364 | 9/1978 | Kimura et al. | 525/498 |
| 4,868,254 | 9/1989 | Wong | 525/539 |

FOREIGN PATENT DOCUMENTS

| | | | |
|---|---|---|---|
| 121965 | 10/1984 | European Pat. Off. . | |
| 257663 | 3/1988 | European Pat. Off. . | |
| 2600431 | 8/1976 | Fed. Rep. of Germany . | |
| 583174 | 8/1943 | United Kingdom | 525/518 |
| 1567374 | 5/1980 | United Kingdom . | |

OTHER PUBLICATIONS

John F. Blias *Amino Resins* Reinhold Pub. Co., 1959, pp. 190–191.

*Primary Examiner*—Richard D. Lovering
*Assistant Examiner*—Philip Tucker

[57] ABSTRACT

Novel thermosetting resin compositions comprise (1) a polyalcohol produced by reduction of a low molecular weight linear alternating polymer of carbon monoxide and at least one ethylenically unsaturated hydrocarbon and (2) a polyfunctional curing agent. The compositions are cured upon application of heat to cured, crosslinked compositions useful as coatings.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RESIN COMPOSITIONS

FIELD OF THE INVENTION

This invention relates to a resin composition based on a polyalcohol derived from a linear alternating polymer of carbon monoxide and at least one ethylenically unsaturated hydrocarbon. More particularly, the invention relates to a resin composition comprising the polyalcohol and a polyfunctional curing agent.

BACKGROUND OF THE INVENTION

A wide variety of thermosetting resins is well known in the art and the resins and cured products therefrom are useful in a variety of applications such as castings and coatings where properties of strength, toughness and a solvent resistance are desired. Particular applications are in the automotive and lacquer industries where good adhesion and temperature stability are particularly important along with solvent and stress resistance.

Also known in the art is the class of linear alternating polymers of carbon monoxide and olefin(s) known as polyketone polymers or polyketones. An early production of such polymers is disclosed by Nozaki, U.S. Pat. No. 3,694,412, for example, wherein polymerization is conducted in the presence of arylphosphine complexes of palladium moieties as catalyst and certain inert solvents. More recent processes for the production of such polymers are illustrated by a number of published European Patent Applications including 121,965, 181,014, 213,671 and 257,663. These processes typically involve a catalyst composition formed from a compound of palladium, cobalt or nickel, the anion of a strong non-hydrohalogenic acid and a bidentate ligand of phosphorus, arsenic or antimony. The scope of the polymerization process is extensive but, without wishing to be limited, a preferred catalyst composition is formed from a palladium compound such as palladium acetate, the anion of a non-hydrohalogenic acid having a pKa below 2, e.g., the anion of trifluoroacetic acid or p-toluenesulfonic acid, and a bidentate ligand of phosphorus such as 1,3-bis(diphenylphosphino)propane or 1,3-bis[di(2-methoxyphenyl)phosphino]propane. The linear alternating polymers are typically materials of relatively high molecular weight but by control of reaction conditions, particularly reaction time and temperature, low molecular weight polymers, also known as oligomers, are alternatively produced.

In West German patent DE 2,600,431 there is described a resin consisting of a hydrogenated ethylene/-carbon monoxide polymer and an amino-containing-/formaldehyde resin. A curable blend of an ethylene/-carbon monoxide copolymer and a melamine/formaldehyde resin is shown in U.S. Pat. No. 1,567,374. A copending U.S. patent application, Ser. No. 433,871, filed Nov. 9, 1989 now U.S. Pat. No. 5,037,944 describes thermosetting resin compositions comprising a linear alternating polymer and certain polyfunctional amines. It would be of advantage to provide an additional resin composition derived from carbon monoxide and olefins, from which coatings and other cured products having good properties can be produced.

SUMMARY OF THE INVENTION

The present invention provides curable, thermosetting resin compositions based on a polyalcohol and a curing agent. More particularly, the present invention provides curable compositions, and cured products thereof, produced from polyalcohols obtained by hydrogenation of low molecular weight polyketone products and polyfunctional curing agents.

DESCRIPTION OF THE INVENTION

The linear alternating polymers of carbon monoxide and at least one ethylenically unsaturated hydrocarbon used as a precursor of a component of the present compositions are low molecular weight polymers, also known as oligomers, having a molecular weight from about 450 to about 3500, preferably from about 1000 to about 1500. Ethylenically unsaturated hydrocarbons used in the production of the low molecular weight polymers have up to 10 carbon atoms inclusive, preferably up to 8 carbon atoms inclusive, and are illustrated by ethylene, propylene, 1-butene, isobutylene, 1-hexene, octene and decene. The straight-chain $\alpha$-olefins are preferred as the polyketone polymer precursor and particularly preferred are ethylene and propylene. The low molecular weight linear alternating polymers are produced from carbon monoxide and ethylenically unsaturated hydrocarbon by the general process of the above-identified published European Patent Applications.

The polymeric chain of the preferred low molecular weight polymers will have a linear alternating structure and be of the general formula

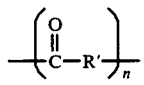

(I)

wherein R' independently is alkylene of from 2 to 8 carbon atoms inclusive and n is an average number which reflects the molecular weight of the polymer. The end groups or "caps" of the polymer will depend on what materials are present during the production of the polymer and how and whether the polymer has been purified. Although the end groups will contribute little to the overall properties of the polymer so that the polymer is fairly represented by the above formula I for the polymeric chain, a more complete formula for a representative polymer produced in the reaction environment of the above published European Patent Applications is the formula

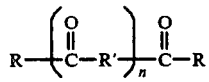

(II)

wherein R independently is alkyl of from 2 to 8 carbon atoms inclusive or alkoxy of up to 8 carbon atoms inclusive, and R' and n have the previously stated meanings. The preferred low molecular weight polymers are those wherein R' is a moiety of ethylene, propylene or of ethylene or propylene and a second ethylenically unsaturated hydrocarbon. Particularly preferred polymers of the above formulas I or II are those copolymers of carbon monoxide wherein R' is ethylene or propylene, especially propylene.

The low molecular weight polymers are produced by processes generally illustrated by the above European Patent Applications. The carbon monoxide and hydrocarbon monomers are contacted under polymerization conditions in the presence of a reaction diluent and a catalyst composition. Alkanolic reaction diluents are preferred, especially methanol, and a useful catalyst composition is formed from palladium acetate, 1,3-bis(-diphenylphosphino)propane and cupric p-toluenesulfonate or trifluoroacetic acid. Typical polymerization conditions include a reaction temperature of from about 30° C. to about 100° C. and a reaction pressure from about 5 bar to about 100 bar. Reactant and catalyst composition contact is maintained in a suitable reactor by conventional methods such as shaking or stirring and subsequent to polymerization the reaction is terminated as by cooling the reaction mixture and releasing the pressure. The low molecular weight polymer is, on occasion, insoluble in the product mixture and on other occasions is soluble, depending in part on the particular reaction diluent employed and the molecular weight of the low molecular weight polymer. The product is recovered by well known techniques such as filtration, solvent removal and precipitation.

The low molecular weight polymer is converted to the polyalcohol employed in the compositions of the invention by a process of hydrogenation. Illustrative hydrogenation processes include conventional catalytic hydrogenation as by contacting the polymer with molecular hydrogen and a heterogeneous transition metal catalyst such as Raney nickel or elemental platinum or palladium, but also include reduction with metal hydrides, e.g., lithium aluminum hydride or sodium borohydride, in a suitable solvent exemplified by tetrahydrofuran, hexafluoroisopropanol or m-cresol. The particular method of reducing the polyketone polymer to the polyalcohol is not critical, provided that the degree of carbonyl group reduction to alcohol group or the equivalent is at least about 20% and preferably from about 50% to about 100%.

The curing agent employed to react with the polyalcohol in the compositions of the invention are polyfunctional curing agents which are able to react with hydroxyl groups of two or more different polymeric chains and thereby form a crosslinked, three-dimensional structure. Suitable polyfunctional curing agents include di- or polyacids, di- or polyamines, di- or polyepoxides and di- or polyisocyanates. Also suitable and generally preferred are the alkoxylated or aryloxylated reaction products of formaldehyde and melamine or benzoguanamine known as aminoplast resins or urea-formaldehyde or phenol-formaldehyde resins. Particularly preferred are alkoxylated melamine-formaldehyde resins such as hexamethoxymethylmelamine.

The curable compositions of the invention comprise the polyalcohol derived from the polyketone polymer and the curing agent. The amount of curing agent to be employed is from about 7% by weight to about 120% by weight, based on the weight of the polyalcohol but amounts of curing agent from about 20% by weight to about 100% by weight on the same basis are preferred. The curing process comprises mixing of the polyalcohol and the curing agent and heating the mixture to an elevated temperature. Curing temperatures found to be useful are at least 100° C. and preferably from about 125° C. to about 250° C. The curable composition may also, on occasion, include a catalyst in order to accelerate the curing process. Suitable catalysts are strong acids such as hydrochloric acid or p-toluenesulfonic acid. No catalyst is required, but amounts of catalyst from about 0.01 mole to about 0.03 mole per mole of polyalcohol are sufficient to accelerate the curing process if catalyst is desired.

The thermosetting resins are preferably mixtures of the polyketone-derived polyalcohol and the curing agent. The resin composition may also include co-reactants to modify the properties of the cured thermoset products. Illustrative co-reactants are di- and polyhydric alcohols such as ethylene glycol, trimethylene glycol and pentaerythritol.

The resin compositions are useful in the production of coatings for solid objects, particularly metal objects, and also shaped objects by procedures which are conventional for thermosetting resins. The resins are cast, extruded, pultruded or laminated and serve as binders in paints and lacquers. The resin compositions may be used as such or may contain a variety of conventional additives such as stabilizers, lubricants, colorants and fillers or reinforcements.

The invention is further illustrated by the following Illustrative Embodiments which should not be construed as limiting the invention.

Illustrative Embodiment I

A linear alternating copolymer of carbon monoxide and propylene was produced by charging to an autoclave of 1 liter capacity equipped with a mechanical stirrer 250 ml of methanol, 106 mg of cupric p-toluenesulfonate, 120 mg of 1,3-bis(diphenylphosphino)propane and 54 mg of palladium acetate. The autoclave was flushed with carbon monoxide and pressurized with carbon monoxide until a pressure of 60 bar was reached. After 100 g of liquid propylene was added, the pressure was adjusted to 40 bar by venting carbon monoxide. The contents of the autoclave, while being stirred, were warmed to 80° C. and maintained at that temperature for 20 hours while the pressure was maintained at 60 bar by continuous addition of carbon monoxide. The autoclave and contents were then cooled to room temperature and the pressure was released. A 69% yield (115 g) of copolymer having a molecular weight of 1100 was recovered from the resulting mixture, stabilized with 2,6-di-tert-butyl-4-methylphenol, and stored under nitrogen. Analysis of the product indicated that about 10% by weight of the product consisted of material having only one carbonyl group and these low boiling compounds were removed by vacuum distillation at 85° C. and 0.1 mm Hg. Infrared and NMR analysis of the remaining product were consistent with a low molecular weight polymer of the formula $$C_3H_7\text{-}(CO\text{—}C_3H_6)_nCO\text{—}OCH_3$$

wherein n was an average number of about 13. The polymer was viscous liquid.

Illustrative Embodiment II

A polyalcohol was produced by adding a solution of 2 g of the polyketone polymer of Illustrative Embodiment I in 25 ml of tetrahydrofuran drop-wise to a stirred suspension of 1 g of lithium aluminum hydride in 10 ml of tetrahydrofuran. The resulting mixture was refluxed for 18 hours when water was added and the resulting mixture was filtered. The mixture was then extracted with chloroform and the extract was washed with water, dried over magnesium sulfate and filtered. Removal of the solvents by evaporation afforded the polyalcohol product as a viscous, ochre colored liquid.

Illustrative Embodiment III

A hard, tough and light brown coating was prepared by providing a thin film of the polyalcohol of Illustrative Embodiment II on a phosphated steel strip and placing the coated strip in a 190° C. oven for 90 minutes. After removal from the oven and cooling, the quality of the coating was qualitatively determined by rubbing with methyl ethyl ketone (MEK). The coating resisted more than 100 MEK rubs.

Illustrative Embodiment IV

A hard, tough and clear coating was prepared by the general procedure of Illustrative Embodiment III except that 25% by weight of hexamethoxymethylmelamine, based on polyalcohol, and one drop of concentrated HCl was added to the coating liquid. The heating was at 140° C. for 60 minutes in a nitrogen atmosphere. A 25 μm thick film was produced which withstood more than 100 MEK rubs and was not visably scratched by a H4 pencil (ASTM-D-3363-74).

Illustrative Embodiment V

A series of experiments to produce coatings was conducted by the general procedure of Illustrative Embodiment IV except that varying proportions of the hexamethoxymethylmelamine, based on the polyalcohol, were employed and the curing temperatures were varied from 75° C. to 150° C. No acid accelerator was employed. In experiments B-E, a 25 μm film was obtained which was not visably scratched with a H4 pencil. The results of rubbing with MEK are shown in the Table.

TABLE

| Experiment | % Curing Agent by weight | Resist MEK-rubs at (curing temp.) 75° C. | 100° C. | 125° C. | 150° C. |
|---|---|---|---|---|---|
| A | 3 | <5 | <5 | <5 | 7 |
| B | 12 | <5 | 5 | 10 | 100 |
| C | 25 | 5 | 12 | 100 | >100 |
| D | 50 | 5 | 16 | >100 | >100 |
| E | 100 | 5 | 25 | >100 | >100 |

What is claimed is:

1. A thermosetting resin composition consisting essentially of a polyalcohol, obtained by hydrogenating at least about 20% of the carbonyl groups of a low molecular weight linear alternating polymer of carbon monoxide and at least one straight-chain α-olefin of up to 10 carbon atoms inclusive, and a polyfunctional curing agent.

2. The composition of claim 1 wherein the molecular weight of the linear alternating polymer is from about 450 to about 3500.

3. The composition of claim 2 wherein the curing agent is a urea-formaldehyde resin or a phenol-formaldehyde resin.

4. The composition of claim 3 wherein the polymer is of the formula

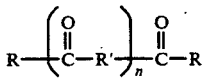

wherein R independently is alkyl of from 2 to 8 carbon atoms inclusive or alkoxy of up to 8 carbon atoms inclusive, R′ independently is alkylene of up to 8 carbon atoms inclusive and n is an average number reflecting the molecular weight of the polymer.

5. The composition of claim 4 wherein the curing agent is an alkoxylated reaction product of a formaldehyde-melamine resin.

6. The composition of claim 3 wherein the polymeric chain of the polymer is represented by the formula

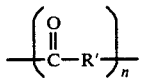

wherein R′ is ethylene or propylene and n is an average number reflecting the molecular weight of the polymer.

7. The composition of claim 6 wherein from about 50% to about 100% of the carbonyl groups of the linear alternating polymer are hydrogenated.

8. The composition of claim 7 wherein the curing agent is an alkoxylated reaction product of a formaldehyde-melamine resin, present in an amount of from about 7% by weight to about 120% by weight, based on polyalcohol.

9. The composition of claim 8 wherein R′ is propylene.

10. The composition of claim 9 wherein the curing agent is hexamethoxymethylmelamine.

11. The cured composition produced by heating the composition of claim 1 to a temperature from about 125° C. to about 250° C.

12. The cured composition produced by heating the composition of claim 10 to a temperature from about 125° C. to about 250° C.

13. A coated solid object wherein the coating is the cured composition of claim 11.

14. A coated metal object wherein the coating is the cured composition of claim 12.

* * * * *